US012781692B2

(12) United States Patent
Hattori et al.

(10) Patent No.: US 12,781,692 B2
(45) Date of Patent: Nov. 3, 2026

(54) FAILURE DETERMINATION DEVICE AND FAILURE DETERMINATION METHOD

(71) Applicant: TOYOTA JIDOSHA KABUSHIKI KAISHA, Toyota (JP)

(72) Inventors: Tatsunobu Hattori, Seto (JP); Ryota Iwasaki, Okazaki (JP); Yutaro Kitano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/269,068

(22) Filed: Jul. 15, 2025

(65) Prior Publication Data

US 2026/0071597 A1 Mar. 12, 2026

(30) Foreign Application Priority Data

Sep. 6, 2024 (JP) ................................ 2024-153926

(51) Int. Cl.
*F02M 21/02* (2006.01)

(52) U.S. Cl.
CPC .... *F02M 21/0293* (2013.01); *F02M 21/0206* (2013.01); *F02M 21/0242* (2013.01)

(58) Field of Classification Search
CPC ........... F02M 21/0293; F02M 21/0206; F02M 21/0242; F02M 21/0221; F02M 21/029; F02D 2041/224; F02D 41/0027; F02D 19/025; F02D 41/221
See application file for complete search history.

(56) References Cited

U.S. PATENT DOCUMENTS 6,401,698 B1 6/2002 Yamazaki et al.
6,467,466 B1 10/2002 Maekawa et al.
2019/0242307 A1 * 8/2019 Engfehr ............. F02D 19/0628

FOREIGN PATENT DOCUMENTS

JP 2000-274311 A 10/2000
JP 2001-041106 A 2/2001

* cited by examiner

*Primary Examiner* — Long T Tran
*Assistant Examiner* — Charles J Brauch

(57) ABSTRACT

A fuel supply system includes a hydrogen engine, a fuel tank, a hydrogen pipe, and a first shut-off valve and a second shut-off valve that are shut-off valves for shutting off hydrogen gas. A failure determination device closes a shut-off valve when an operation that request to stop the hydrogen engine is performed, and executes a failure determination routine that monitors the decrease rate of pressure of hydrogen gas at the downstream side of the shut-off valve while keeping the hydrogen engine running, and determines that the shut-off valve is not properly closed when the decrease rate is slow. When an operation that requests to run the hydrogen engine is performed during the execution of the failure determination routine, the failure determination device opens the shut-off valve and stops the failure determination routine while keeping the hydrogen engine running.

4 Claims, 3 Drawing Sheets

FAILURE DETERMINATION DEVICE AND FAILURE DETERMINATION METHOD

CROSS-REFERENCE TO RELATED APPLICATIONS

This application is based upon and claims the benefit of priority from Japanese Patent Application No. 2024-153926, filed on Sep. 6, 2024, the entire contents of which are incorporated herein by reference.

BACKGROUND

1. Field

The present disclosure relates to a failure determination device and a failure determination method.

2. Description of Related Art

Japanese Laid-Open Patent Publication No. 2000-274311 describes a failure determination device in a fuel supply system. The fuel supply system includes a hydrogen engine that uses hydrogen gas as fuel, and a fuel tank that stores the hydrogen gas used by the hydrogen engine. The hydrogen gas stored in the fuel tank is sent to the hydrogen engine through a hydrogen pipe. The fuel supply system includes a shut-off valve arranged on the hydrogen pipe. The shut-off valve shuts off the hydrogen gas supplied from the fuel tank to the hydrogen engine in the hydrogen pipe.

The failure determination device described in the above-mentioned patent document executes a failure determination routine. In the failure determination routine, the failure determination device determines whether or not the shut-off valve has a failure based on a change in pressure of hydrogen gas at a location between the shut-off valve and the hydrogen engine in a state in which the shut-off valve is closed and the hydrogen engine is consuming hydrogen gas. In this description, a state in which the shut-off valve has a failure means a state in which the shut-off valve is not properly closed and does not shut off the hydrogen gas in the hydrogen pipe.

The above-described failure determination device continues the closed state of the shut-off valve until the failure determination routine is completed. Therefore, the hydrogen gas is not supplied from the fuel tank until the failure determination routine is completed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is a failure determination device for a fuel supply system. The fuel supply system includes a hydrogen engine configured to use hydrogen gas as fuel, a fuel tank configured to store the hydrogen gas, a hydrogen pipe used to guide the hydrogen gas from the fuel tank to the hydrogen engine, and a shut-off valve arranged on the hydrogen pipe and configured to shut off supply of the hydrogen gas from the fuel tank to the hydrogen engine. The failure determination device includes processing circuitry configured to control the shut-off valve and the hydrogen engine to determine whether the shut-off valve has a failure. In response to an operation that requests to stop the hydrogen engine performed by a user of a vehicle including the fuel supply system, the processing circuitry is configured to execute a failure determination routine that includes executing a control that closes the shut-off valve and then monitoring a decrease rate of pressure of the hydrogen gas at a downstream side of the shut-off valve while keeping the hydrogen engine running and determining that the shut-off valve is not properly closed based on the decrease rate being less than that when the shut-off valve is properly closed. In response to an operation of the user that requests to run the hydrogen engine during execution of the failure determination routine, the processing circuitry is configured to execute a control that opens the shut-off valve and stop the failure determination routine while keeping the hydrogen engine running.

An aspect of the present disclosure is a failure determination method applied to a fuel supply system including a hydrogen engine configured to use hydrogen gas as fuel, a fuel tank configured to store the hydrogen gas, a hydrogen pipe used to guide the hydrogen gas from the fuel tank to the hydrogen engine, and a shut-off valve arranged on the hydrogen pipe and configured to shut off supply of the hydrogen gas from the fuel tank to the hydrogen engine. The failure determination method is for controlling the shut-off valve and the hydrogen engine to determine whether the shut-off valve has a failure. The failure determination method includes, in response to an operation that requests to stop the hydrogen engine performed by a user of a vehicle including the fuel supply system, starting a failure determination routine, with a failure determination device. The failure determination routine includes executing a control that closes the shut-off valve and then monitoring a decrease rate of pressure of the hydrogen gas at a downstream side of the shut-off valve while keeping the hydrogen engine running and determining that the shut-off valve is not properly closed based on the decrease rate being less than that when the shut-off valve is properly closed. The failure determination method further includes determining, with the failure determination device, that an operation that requests to run the hydrogen engine is performed by the user. The failure determination method further includes, in response to an operation of the user that requests to run the hydrogen engine during execution of the failure determination routine, with the failure determination device, executing a control that opens the shut-off valve and stopping the failure determination routine while keeping the hydrogen engine running.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a failure determination device will be described with reference to FIGS. 1 to 3.

Configuration of Fuel Supply System 10

The fuel supply system 10 is mounted on a vehicle. As shown in FIG. 1, the fuel supply system 10 includes a fuel tank 11, a hydrogen pipe 12, and a hydrogen engine 15.

The fuel tank 11 stores hydrogen gas supplied from the outside. As shown in FIG. 1, the fuel tank 11 is connected to the hydrogen engine 15 through the hydrogen pipe 12. The hydrogen pipe 12 guides the hydrogen gas from the fuel tank 11 to the hydrogen engine 15. The hydrogen gas guided to the hydrogen engine 15 is supplied from an injector of the hydrogen engine 15 into a cylinder of the hydrogen engine 15.

The hydrogen engine 15 uses the hydrogen gas as fuel. The hydrogen engine 15 burns hydrogen gas in the cylinder and outputs driving force of a vehicle that has the fuel supply system 10.

Figure 1:
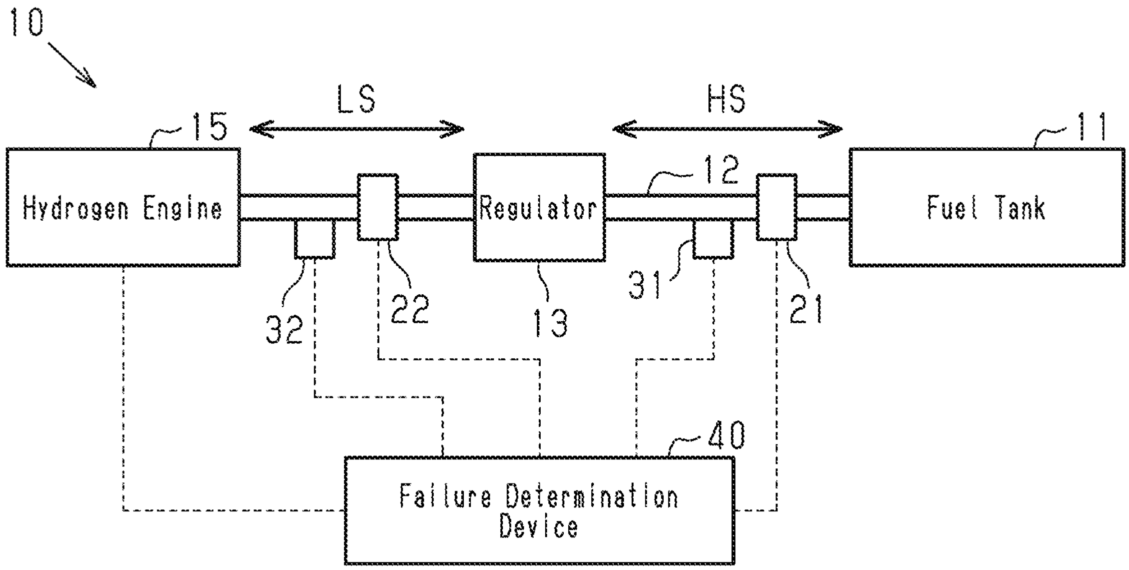
FIG. 1 is a schematic diagram showing a configuration of a fuel supply system including a failure determination device according to an embodiment.

As shown in FIG. 1, a regulator 13, a plurality of shut-off valves, and a plurality of pressure sensors are installed on the hydrogen pipe 12.

The regulator 13 reduces the pressure of the hydrogen gas supplied from the fuel tank 11 to the hydrogen engine 15 to regulate the pressure of the hydrogen gas to a level that is appropriate to the hydrogen engine 15.

FIG. 1 shows a high-pressure section HS and a low-pressure section LS in the hydrogen pipe 12. The high-pressure section HS is a portion of the hydrogen pipe 12 through which the hydrogen gas flows before flowing through the regulator 13. The low-pressure section LS is a portion of the hydrogen pipe 12 through which the hydrogen gas flows after flowing through the regulator 13.

As shown in FIG. 1, the fuel supply system 10 includes a first shut-off valve 21 and a second shut-off valve 22 as the plurality of shut-off valves. The shut-off valve shuts off the supply of hydrogen gas from the fuel tank 11 to the hydrogen engine 15.

As shown in FIG. 1, the first shut-off valve 21 is arranged on a portion of the hydrogen pipe 12 between the fuel tank 11 and the regulator 13. When the first shut-off valve 21 is closed, the high-pressure section HS is closed.

As shown in FIG. 1, the second shut-off valve 22 is arranged on a portion of the hydrogen pipe 12 between the regulator 13 and the hydrogen engine 15. When the second shut-off valve 22 is closed, the low-pressure section LS is closed.

As shown in FIG. 1, the fuel supply system 10 includes a first pressure sensor 31 and a second pressure sensor 32 as the plurality of pressure sensors. As shown in FIG. 1, the first pressure sensor 31 is arranged on a portion of the high-pressure section HS at the downstream side of the first shut-off valve 21. As shown in FIG. 1, the second pressure sensor 32 is arranged on a portion of the low-pressure section LS at the downstream side of the second shut-off valve 22.

As shown in FIG. 1, the fuel supply system 10 includes a failure determination device 40. The failure determination device 40 is applied to the fuel supply system 10. The failure determination device 40 is, for example, an electronic controller that controls injection of hydrogen gas by the injector of the hydrogen engine 15.

As shown in FIG. 1, the failure determination device 40 is communicably connected to the hydrogen engine 15. The failure determination device 40 controls the operation of the hydrogen engine 15.

As shown in FIG. 1, the failure determination device 40 is communicably connected to the first shut-off valve 21 and the second shut-off valve 22. The failure determination device 40 controls the opening and closing of the first shut-off valve 21 and the second shut-off valve 22.

As shown in FIG. 1, the failure determination device 40 is communicably connected to the first pressure sensor 31 and the second pressure sensor 32. The failure determination device 40 acquire values measured by the first pressure sensor 31 and the second pressure sensor 32.

The failure determination device 40 executes a failure determination routine. The failure determination routine is a series of processes performed by the failure determination device 40 to determine whether a shut-off valve has a failure. In this description, a failure in the shut-off valve refers to a state in which the shut-off valve is not properly closed despite an instruction from the failure determination device 40 to close the shut-off valve. For example, when an object is caught in the shut-off valve, the above-described failure occurs.

Aspect of Process in First Failure Determination Routine DF1

Figure 2:
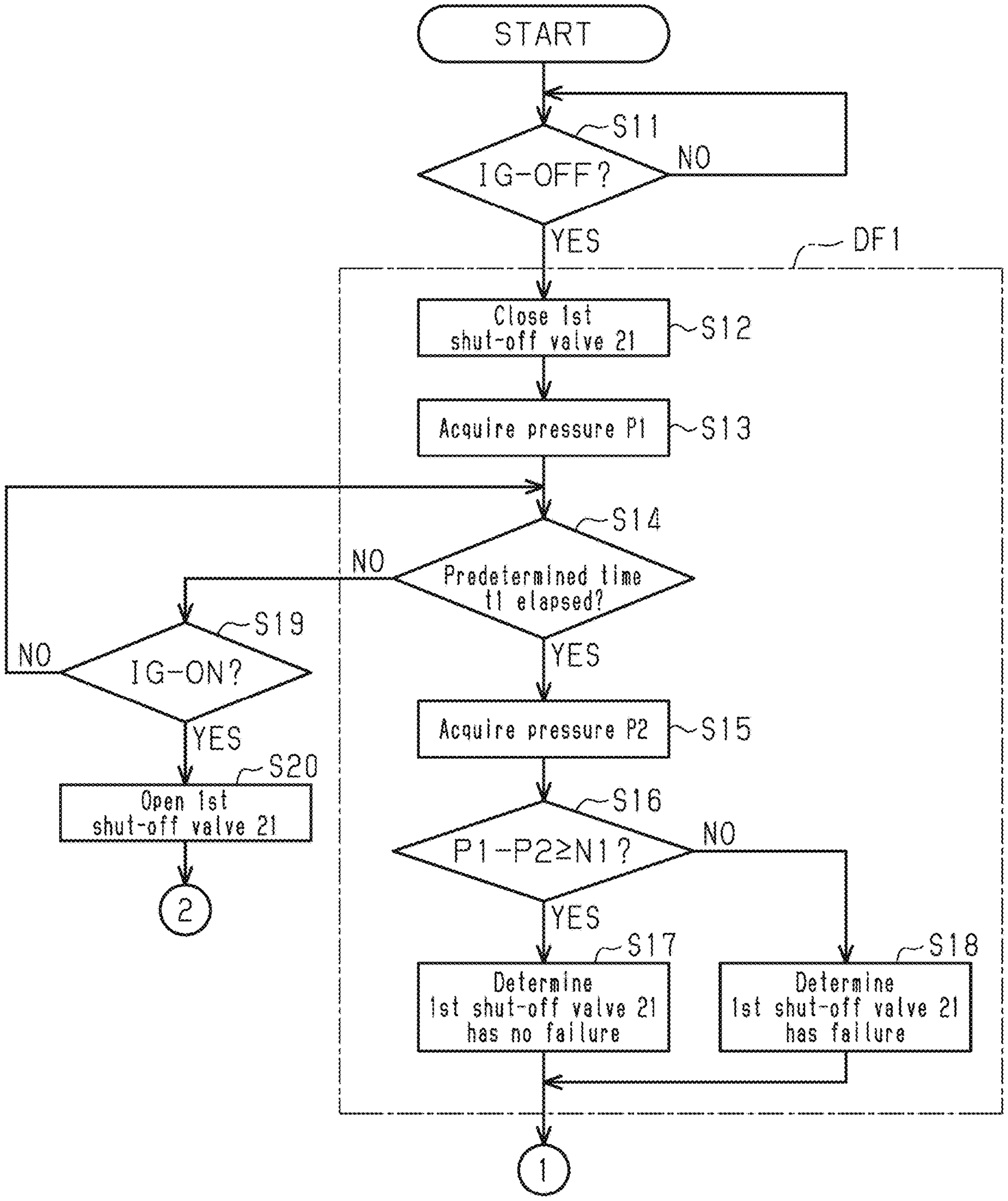
FIG. 2 is a flowchart showing a flow of a series of processes in a first failure determination routine executed by the failure determination device.
Figure 3:
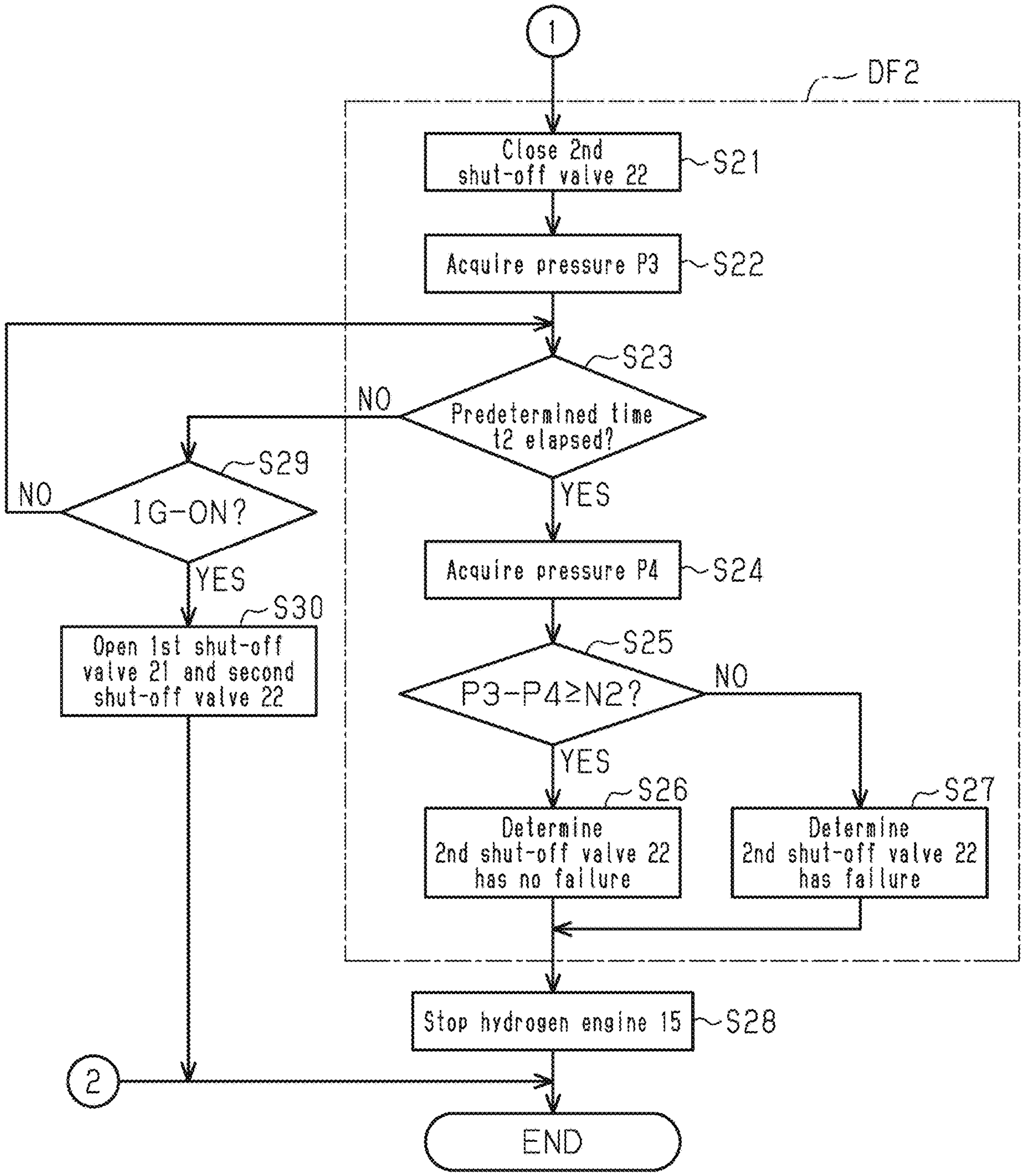
FIG. 3 is a flowchart showing a flow of a series of processes in a second failure determination routine executed by the failure determination device.

FIGS. 2 and 3 show a flow of a series of processes executed when the failure determination device 40 performs the failure determination routine. The series of processes shown in FIGS. 2 and 3 are executed while the vehicle is in operation. When the vehicle is in operation, the failure determination device 40 opens the first shut-off valve 21 and the second shut-off valve 22 while allowing the hydrogen engine 15 to run.

In the process of step S11, the failure determination device 40 determines whether or not the user has performed an operation to turn off the ignition switch (IG-OFF). The operation of turning off the ignition switch corresponds to an operation of a user that requests to stop the hydrogen engine 15.

When the failure determination device 40 determines that the user has not performed the operation of turning off the ignition switch in the process of step S11 (step S11: NO), the failure determination device 40 performs the process of step S11 again. Thus, the failure determination device 40 repeats the process of step S11 until the user turns off the ignition switch. When the failure determination device 40 determines that the user has performed the operation of turning off the ignition switch in the process of step S11 (step S11: YES), the failure determination device 40 proceeds to step S12.

The failure determination device 40 starts the failure determination routine when it is determined that the user has performed an operation to turn off the ignition switch. After the operation of turning off the ignition switch is performed, the failure determination device 40 performs the failure determination routine while keeping the hydrogen engine 15 running.

The processing from step S12 to step S18 shown in FIG. 2 corresponds to a first failure determination routine DF1 performed on the first shut-off valve 21. The first failure determination routine DF1 determines whether the first shut-off valve 21 has a failure.

In the process of step S12, the failure determination device 40 closes the first shut-off valve 21. In this process, the failure determination device 40 maintains the second shut-off valve 22 in an open state.

In the next process of step S13, the failure determination device 40 acquires pressure P1. The pressure P1 is the pressure of the hydrogen gas at the downstream side of the first shut-off valve 21 immediately after the first shut-off valve 21 is closed. The failure determination device 40 acquires the pressure P1 from the first pressure sensor 31.

In the next process of step S14, the failure determination device 40 determines whether or not a predetermined time t1 has elapsed after the first shut-off valve 21 is closed. The predetermined time t1 is determined in advance.

When the failure determination device 40 determines that the predetermined time t1 has not elapsed in the process of step S14 (step S14: NO), the failure determination device 40 proceeds to step S19.

In the process of step S19, the failure determination device 40 determines whether or not the user has performed an operation to turn on the ignition switch (IG-ON). The operation of turning on the ignition switch is an operation of a user that requests to run the hydrogen engine 15. Thus, in the process of step S19, the failure determination device 40 determines whether the user has performed an operation to request to run the hydrogen engine 15 during the execution of the first failure determination routine DF1.

When the failure determination device 40 determines in the process of step S19 that the user has not performed the operation of turning on the ignition switch (step S19: NO), the failure determination device 40 executes the process of step S14 again.

When the failure determination device 40 determines that the predetermined time t1 has elapsed in the process of step S14 (step S14: YES), the failure determination device 40 proceeds to step S15. In the process of step S15, the failure determination device 40 acquires pressure P2. The pressure P2 is the pressure of the hydrogen gas at the downstream side of the first shut-off valve 21 when the predetermined time t1 elapses after the first shut-off valve 21 is closed. The failure determination device 40 acquires the pressure P2 from the first pressure sensor 31.

In the next process of step S16, the failure determination device 40 determines whether or not the difference between the pressures P1 and P2 is greater than or equal to a threshold value N1.

In the first failure determination routine DF1, the hydrogen gas flowing through the hydrogen pipe 12 at the downstream side of the first shut-off valve 21 is gradually consumed by the hydrogen engine 15 during the predetermined time t1. When the first shut-off valve 21 is not properly closed, a decrease rate of the pressure of the hydrogen gas at the downstream side of the first shut-off valve 21 is lower than that when the first shut-off valve 21 is properly closed.

In the processing from step S13 to step S16, the failure determination device 40 monitors the decrease rate of the pressure of the hydrogen gas at the downstream side of the first shut-off valve 21. The difference between the pressures P1 and P2 reflects the decrease rate of the pressure of the hydrogen gas at the downstream side of the first shut-off valve 21.

The threshold value N1 is determined in advance by the manufacturer of the failure determination device 40. The manufacturer of the failure determination device 40 measures, for example, the difference between the pressures P1 and P2 when the first shut-off valve 21 is properly closed. Then, the manufacturer of the failure determination device 40 sets the threshold value N1 based on the measured value.

When the failure determination device 40 determines in the process of step S16 that the difference between the pressures P1 and P2 is greater than or equal to the threshold value N1 (step S16: YES), the failure determination device 40 proceeds to step S17. In the process of step S17, the failure determination device 40 determines that the first shut-off valve 21 does not have a failure.

When the failure determination device 40 determines in the process of step S16 that the difference between the pressures P1 and P2 is less than the threshold value N1 (step S16: NO), the failure determination device 40 proceeds to step S18. The state in which the difference between the pressures P1 and P2 is less than the threshold value N1 indicates that the decrease rate of the pressure of the hydrogen gas at the downstream side of the first shut-off valve 21 is lower than that when the first shut-off valve 21 is properly closed. In the process of step S18, the failure determination device 40 determines that the first shut-off valve 21 has a failure. Thus, the determination result is output in the process of step S17 or the process of step S18, whereby the first failure determination routine DF1 is completed.

Aspect of Process when First Failure Determination Routine DF1 Stops

When it is determined in the process of step S19 that the user has performed the operation of turning on the ignition switch (step S19: YES), the failure determination device 40 executes the process of step S20.

In the process of step S20, the failure determination device 40 opens the first shut-off valve 21. When the failure determination device 40 opens the first shut-off valve 21 in the process of step S20, all of the shut-off valves installed in the fuel supply system 10 are open. As a result, hydrogen gas is supplied from the fuel tank 11 to the hydrogen engine 15 that is running.

As shown in FIG. 3, after executing the process of step S20, the failure determination device 40 ends the series of processes shown in FIGS. 2 and 3. In this case, the failure determination device 40 ends the series of processes shown in FIGS. 2 and 3 without determining whether the first shut-off valve 21 has a failure. That is, the failure determination device 40 stops the first failure determination routine DF1 when the operation of turning on the ignition switch is performed during the execution of the first failure determination routine DF1.

Aspect of Process in Second Failure Determination Routine DF2

As shown in FIG. 3, when the first failure determination routine DF1 is completed, the failure determination device 40 proceeds to step S21 and starts a second failure determination routine DF2. The second failure determination routine DF2 determines whether the second shut-off valve 22 has a failure.

The processing from step S21 to step S27 shown in FIG. 3 corresponds to the second failure determination routine DF2.

When the first failure determination routine DF1 ends without being interrupted, the failure determination device 40 executes the second failure determination routine DF2. In this way, the failure determination device 40 executes the failure determination routines while sequentially changing the target shut-off valve from the upstream side.

In the process of step S21, the failure determination device 40 closes the second shut-off valve 22.

In the next process of step S22, the failure determination device 40 acquires pressure P3. The pressure P3 is the pressure of the hydrogen gas at the downstream side of the second shut-off valve 22 immediately after the second shut-off valve 22 is closed. The failure determination device 40 acquires the pressure P3 from the second pressure sensor 32.

In the next process of step S23, the failure determination device 40 determines whether or not a predetermined time t2 has elapsed after the second shut-off valve 22 is closed. The predetermined time t2 is determined in advance.

When the failure determination device 40 determines that the predetermined time t2 has not elapsed in the process of step S23 (step S23: NO), the failure determination device 40 proceeds to step S29. In the process of step S29, the failure determination device 40 determines whether or not the user has performed an operation to turn on the ignition switch. Thus, in the process of step S29, the failure determination device 40 determines whether or not the user has performed an operation to request to run the hydrogen engine 15 during the execution of the second failure determination routine DF2.

When the failure determination device 40 determines in the process of step S29 that the user has not performed the operation of turning on the ignition switch (step S29: NO), the failure determination device 40 executes the process of step S23 again.

When the failure determination device 40 determines that the predetermined time t2 has elapsed in the process of step S23 (step S23: YES), the failure determination device 40 proceeds to step S24. In the process of step S24, the failure determination device 40 acquires pressure P4. The pressure P4 is the pressure of the hydrogen gas at the downstream side of the second shut-off valve 22 when the predetermined time t2 elapses after the second shut-off valve 22 is closed. The failure determination device 40 acquires the pressure P4 from the second pressure sensor 32.

In the process of step S25, the failure determination device 40 determines whether or not the difference between the pressures P3 and P4 is greater than or equal to a threshold value N2.

In the second failure determination routine DF2, the hydrogen gas flowing through the portion of the hydrogen pipe 12 downstream of the second shut-off valve 22 is gradually consumed by the hydrogen engine 15 during the predetermined time t2. When the second shut-off valve 22 is not properly closed, a decrease rate of the pressure of the hydrogen gas at the downstream side of the second shut-off valve 22 is lower than when the second shut-off valve 22 is properly closed.

The difference between the pressures P3 and P4 reflects the decrease rate of the pressure of the hydrogen gas at the downstream side of the second shut-off valve 22. In the processing from step S22 to step S25, the failure determination device 40 monitors the decrease rate of the pressure of the hydrogen gas at the downstream side of the second shut-off valve 22.

Similar to the threshold value N1, the threshold value N2 is predetermined by the manufacturer of the failure determination device 40. The manufacturer of the failure determination device 40 measures, for example, the difference between the pressures P3 and P4 when the second shut-off valve 22 is properly closed. Then, the manufacturer of the failure determination device 40 sets the threshold value N2 based on the measured value.

When the failure determination device 40 determines in the process of step S25 that the difference between the pressures P3 and P4 is greater than or equal to the threshold value N2 (step S25: YES), the failure determination device 40 proceeds to step S26. In the process of step S26, the failure determination device 40 determines that the second shut-off valve 22 does not have a failure.

When the failure determination device 40 determines in the process of step S25 that the difference between the pressures P3 and P4 is less than the threshold value N2 (step S25: NO), the failure determination device 40 proceeds to step S27. A state in which the difference between the pressures P3 and P4 is less than the threshold value N2 indicates that the decrease rate of the pressure of the hydrogen gas at the downstream side of the second shut-off valve 22 is lower than that when the second shut-off valve 22 is properly closed. In the process of step S27, the failure determination device 40 determines that the second shut-off valve 22 has a failure. In this way, the determination result is output in the process of step S26 or the process of step S27, whereby the second failure determination routine DF2 is completed.

When the first failure determination routine DF1 and the second failure determination routine DF2 are completed, all the failure determination routines end. The failure determination device 40 executes the process of step S28 after all the failure determination routines end. In the process of step S28, the failure determination device 40 stops the hydrogen engine 15. Then, the failure determination device 40 ends the series of processes shown in FIGS. 2 and 3.

Aspect of Process when Second Failure Determination Routine DF2 Stops

When it is determined in the process of step S29 that the user has performed the operation of turning on the ignition switch (step S29: YES), the failure determination device 40 executes the process of step S30.

In the process of step S30, the failure determination device 40 opens the first and second shut-off valves 21 and 22. As a result, all the shut-off valves installed in the fuel supply system 10 are open. As a result, hydrogen gas is supplied from the fuel tank 11 to the hydrogen engine 15 that is running.

As shown in FIG. 3, after executing the process of step S30, the failure determination device 40 ends the series of processes shown in FIGS. 2 and 3. In this case, the failure determination device 40 ends the series of processes shown in FIGS. 2 and 3 without determining whether the second shut-off valve 22 has a failure. That is, the failure determination device 40 stops the second failure determination routine DF2 when the operation of turning on the ignition switch is performed during the execution of the second failure determination routine DF2.

Operation of the Present Embodiment

Since the hydrogen gas is not supplied from the fuel tank 11 while the failure determination routine is executed, the amount of fuel that can be used by the hydrogen engine 15 is limited.

The failure determination device 40 opens the shut-off valve when an operation that requests to run the hydrogen engine 15 is performed during the execution of the failure determination routine. That is, the failure determination device 40 stops executing the failure determination routine and resumes the supply of hydrogen gas from the fuel tank 11.

Advantages of the Present Embodiment (1) When the user performs an operation to request to run the hydrogen engine 15 before the failure determination routine is completed, the failure determination device 40 promptly resumes the supply of the fuel so that the vehicle becomes drivable in accordance with the operation of the user.

(2) The fuel supply system 10 includes a plurality of shut-off valves. The failure determination device 40 executes the failure determination routine when the shut-off valves located at the downstream side of a target shut-off valve are open as the target shut-off valve is sequentially changed from the upstream side. When the user performs an operation to request to run the hydrogen engine 15 during the execution of the failure determination routine, the failure determination device 40 opens all of the shut-off valves and stops the failure determination routine.

When any of the shut-off valves is closed, the hydrogen gas cannot be supplied from the fuel tank 11 to the hydrogen engine 15. During the execution of the failure determination routine performed on any of the shut-off valves, the failure determination device 40 opens all of the shut-off valves when the hydrogen engine 15 is requested to run. With this configuration, even when the fuel supply system 10 includes a plurality of shut-off valves, the failure determination device 40 resumes the supply of hydrogen gas from the fuel tank 11 to the hydrogen engine 15 in response to an operation that requests to run the hydrogen engine 15.

(3) The fuel supply system 10 includes the regulator 13 arranged on the hydrogen pipe 12 to regulate the pressure of the hydrogen gas supplied from the fuel tank 11 to the hydrogen engine 15. The fuel supply system 10 includes, as a shut-off valve, the first shut-off valve 21 arranged on a portion of the hydrogen pipe 12 between the fuel tank 11 and the regulator 13. The fuel supply system 10 includes, as a shut-off valve, the second shut-off valve 22 arranged on a portion of the hydrogen pipe 12 between the regulator 13 and the hydrogen engine 15. The failure determination device 40 executes the first failure determination routine DF1, which is a failure determination routine performed on the first shut-off valve 21, while keeping the hydrogen engine 15 running in a state where the first shut-off valve 21 is closed and the second shut-off valve 22 is open. The failure determination device 40 executes the second failure determination routine DF2, which is a failure determination routine performed on the second shut-off valve 22, while keeping the hydrogen engine 15 running in a state where the first shut-off valve 21 and the second shut-off valve 22 are closed. When the user performs an operation to request to run the hydrogen engine 15 during the execution of the first failure determination routine DF1, the failure determination device 40 opens the first shut-off valve 21 and stops the first failure determination routine DF1 while keeping the hydrogen engine 15 running. When the user performs an operation to request to run hydrogen engine 15 during the execution of the second failure determination routine DF2, the failure determination device 40 opens the first and second shut-off valves 21 and 22 and stops the second failure determination routine DF2 while keeping the hydrogen engine 15 running.

The fuel supply system 10 includes the two shut-off valves, namely, the first shut-off valve 21 and the second shut-off valve 22, so as to sandwich the regulator 13. The failure determination device 40 performs the failure determination routine on each of the first shut-off valve 21 and the second shut-off valve 22. When an operation that request to run the hydrogen engine 15 during the execution of the failure determination routine, the failure determination device 40 opens both of the first shut-off valve 21 and the second shut-off valve 22. Thus, when the fuel supply system 10 includes the first shut-off valve 21 and the second shut-off valve 22, the failure determination device 40 resumes the supply of the hydrogen gas from the fuel tank 11 to the hydrogen engine 15 in response to an operation that requests to run the hydrogen engine 15.

(4) The above-described failure determination method includes a step (step S11) of, when the user of the vehicle having the fuel supply system 10 performs an operation to stop the hydrogen engine 15, starting a failure determination routine in which the failure determination device 40 closes the shut-off valve, monitors the decrease rate of the pressure of the hydrogen gas at the downstream side of the shut-off valve while keeping the hydrogen engine 15 running to determine that the shut-off valve is not properly closed when the decrease rate is low. The above-described failure determination method includes steps (step S19 and step S29) in which the failure determination device 40 determines that an operation that requests to run the hydrogen engine 15 is performed by the user. The failure determination method includes steps (step S20 and step S30) in which the failure determination device 40 opens the shut-off valves and stops the failure determination routine while keeping the hydrogen engine 15 running when the user performs an operation to request to run the hydrogen engine 15 during the execution of the failure determination routine.

The above-described failure determination method opens the shut-off valve when an operation that requests to run the hydrogen engine 15 is performed during the execution of the failure determination routine. That is, the above-described failure determination method stops executing the failure determination routine and resumes the supply of hydrogen gas from the fuel tank 11.

As a result, in the above-described failure determination method, when the user performs an operation to request to run the hydrogen engine 15 before the failure determination routine is completed, the supply of the fuel can be promptly resumed so that the vehicle becomes drivable in accordance with the operation of the user.

Modified Examples

The present embodiment may be modified as described below. The present embodiment and the following modified examples can be combined as long as the combined modified examples remain technically consistent with each other.

The fuel supply system 10 includes two shut-off valves, i.e., the first shut-off valve 21 and the second shut-off valve 22. The number of shut-off valves installed in the fuel supply system 10 is not limited to that in the above-described embodiment. The fuel supply system 10 may include three or more shut-off valves. The fuel supply system 10 may include one shut-off valve.

The fuel supply system 10 described above includes the regulator 13. The fuel supply system 10 may not include the regulator 13.

The above-described failure determination device 40 sequentially changes the shut-off valve to be subjected to the failure determination routine from the upstream side. On the other hand, the mode in which the failure determination device 40 changes the target of the failure determination routine is not limited to the above-described embodiment. For example, the failure determination device 40 may change the shut-off valve to be subjected to the failure determination routine in order from the downstream side.

The failure determination device 40 includes a central processing unit (CPU), a random access memory (RAM), and a read only memory (ROM). The failure determination device 40 executes software processing. However, this is only an example. For example, the failure determination device 40 may include a dedicated hardware circuit that processes at least a part of the software processing executed in the above-described embodiment. The dedicated hardware circuit is, for example, an application specific integrated circuit (ASIC). That is, the failure determination device 40 may have any one of the following configurations (a) The failure determination device 40 includes a processing device that executes all processes in accordance with a program and a program storage device such as a ROM that stores the program. That is, the failure determination device 40 includes a software execution device. (b) The failure determination device 40 includes a processing device that executes a part of processing in accordance with a program, and a program storage device. Further, the failure determination device 40 includes a dedicated hardware circuit that executes the remaining processing. (c) The failure determination device 40 includes a dedicated hardware circuit that executes all processes. Multiple software execution devices and/or multiple dedicated hardware circuits may be provided. That is, the processes may be executed by processing circuitry including at least one of a software execution device and a dedicated hardware circuit. The processing circuitry may include multiple software execution devices and multiple dedicated hardware circuits. The program storage device, or computer readable medium, includes any type of storage device that is a medium accessible by a versatile computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A failure determination device for a fuel supply system, the fuel supply system including a hydrogen engine configured to use hydrogen gas as fuel, a fuel tank configured to store the hydrogen gas, a hydrogen pipe used to guide the hydrogen gas from the fuel tank to the hydrogen engine, and a shut-off valve arranged on the hydrogen pipe and configured to shut off supply of the hydrogen gas from the fuel tank to the hydrogen engine, the failure determination device, comprising:

processing circuitry configured to control the shut-off valve and the hydrogen engine to determine whether the shut-off valve has a failure, wherein in response to an operation that requests to stop the hydrogen engine performed by a user of a vehicle including the fuel supply system, the processing circuitry is configured to execute a failure determination routine including:

executing a control that closes the shut-off valve and then monitoring a decrease rate of pressure of the hydrogen gas at a downstream side of the shut-off valve while keeping the hydrogen engine running; and determining that the shut-off valve is not properly closed based on the decrease rate being less than that when the shut-off valve is properly closed, and in response to an operation of the user that requests to run the hydrogen engine during execution of the failure determination routine, the processing circuitry is configured to execute a control that opens the shut-off valve and stop the failure determination routine while keeping the hydrogen engine running.

2. The failure determination device according to claim 1, wherein the shut-off valve includes a first shut-off valve, the fuel supply system further includes a second shut-off valve arranged on the hydrogen pipe and configured to shut off supply of the hydrogen gas from the fuel tank to the hydrogen engine, the second shut-off valve is arranged at a downstream side of the first shut-off valve, the failure determination routine further includes, after determining whether the first shut-off valve is properly closed while the second shut-off valve is open:

executing a control that closes the second shut-off valve and then monitoring the decrease rate of pressure of the hydrogen gas at a downstream side of the second shut-off valve while keeping the hydrogen engine running; and determining that the second shut-off valve is not properly closed based on the decrease rate being less than that when the second shut-off valve is properly closed, and in response to an operation of the user that requests to run the hydrogen engine during execution of the failure determination routine, the processing circuitry is configured to execute a control that opens the first shut-off valve and the second shut-off valve and stop the failure determination routine.

3. The failure determination device according to claim 2, wherein the fuel supply system further includes a regulator arranged on the hydrogen pipe and configured to regulate pressure of the hydrogen gas supplied from the fuel tank toward the hydrogen engine, the first shut-off valve is arranged on a portion of the hydrogen pipe between the fuel tank and the regulator, the second shut-off valve is arranged on a portion of the hydrogen pipe between the regulator and the hydrogen engine, in response to an operation of the user that requests to run the hydrogen engine during execution of the failure determination routine performed on the first shut-off valve, the processing circuitry is configured to execute a control that opens the first shut-off valve and stop the failure determination routine performed on the first shut-off valve while keeping the hydrogen engine running, and in response to an operation of the user that requests to run the hydrogen engine during execution of the failure determination routine performed on the second shut-off valve, the processing circuitry is configured to execute a control that opens the first shut-off valve and the second shut-off valve and stop the failure determination routine performed on the second shut-off valve while keeping the hydrogen engine running.

4. A failure determination method being applied to a fuel supply system including a hydrogen engine configured to use hydrogen gas as fuel, a fuel tank configured to store the hydrogen gas, a hydrogen pipe used to guide the hydrogen gas from the fuel tank to the hydrogen engine, and a shut-off valve arranged on the hydrogen pipe and configured to shut off supply of the hydrogen gas from the fuel tank to the hydrogen engine, the failure determination method being for controlling the shut-off valve and the hydrogen engine to determine whether the shut-off valve has a failure, the failure determination method, comprising, in response to an operation that requests to stop the hydrogen engine performed by a user of a vehicle including the fuel supply system:

starting a failure determination routine, with a failure determination device, the failure determination routine including executing a control that closes the shut-off valve and then monitoring a decrease rate of pressure of the hydrogen gas at a downstream side of the shut-off valve while keeping the hydrogen engine running and determining that the shut-off valve is not properly closed based on the decrease rate being less than that when the shut-off valve is properly closed;

determining, with the failure determination device, that an operation that requests to run the hydrogen engine is performed by the user; and in response to an operation of the user that requests to run the hydrogen engine during execution of the failure determination routine, with the failure determination device, executing a control that opens the shut-off valve and stopping the failure determination routine while keeping the hydrogen engine running.

* * * * *